United States Patent
Dill

(10) Patent No.: US 10,435,089 B2
(45) Date of Patent: Oct. 8, 2019

(54) ANTI-ROLLOVER TRAILER

(71) Applicant: Blake Dill, Abilene, TX (US)

(72) Inventor: Blake Dill, Abilene, TX (US)

(*) Notice: Subject to any disclaimer, the term of this patent is extended or adjusted under 35 U.S.C. 154(b) by 0 days.

(21) Appl. No.: 15/400,783

(22) Filed: Jan. 6, 2017

(65) Prior Publication Data

US 2018/0194414 A1    Jul. 12, 2018

(51) Int. Cl.
*B62D 63/06* (2006.01)
*B60D 1/01* (2006.01)
*B62D 53/06* (2006.01)
*B60P 3/22* (2006.01)

(52) U.S. Cl.
CPC ............ *B62D 53/06* (2013.01); *B60P 3/2205* (2013.01); *B60P 3/2225* (2013.01)

(58) Field of Classification Search
CPC .............................. B62D 63/06; B60D 1/015
USPC ...................................... 296/182.1; 280/837
See application file for complete search history.

(56) References Cited

U.S. PATENT DOCUMENTS 6,394,533 B1 * 5/2002 Ladell ................ B60P 3/32
                                                         296/165
8,523,232 B2 * 9/2013 DeLaRosa, II ....... B60P 3/2225
                                                         280/837

* cited by examiner

*Primary Examiner* — Joseph D. Pape
*Assistant Examiner* — Dana D Ivey
(74) *Attorney, Agent, or Firm* — Shannon L Warren

(57) ABSTRACT

A trailer configured to lower an overall center of gravity. Said trailer comprises a tank, a wheel assembly, a kingpin assembly, a height, a length. Said tank comprising a cavity contained within a lower body, an upper body, a transitioning body, a front end, and a rear end. Said tank comprising a lower center of gravity, an upper center of gravity and said overall center of gravity. Said lower body comprising said lower center of gravity, a lower body ground clearance, a lower body length and a lower body height. Said upper body comprising said upper center of gravity, an upper body ground clearance, said height, and an upper body length. Said tank comprising said length, a height equal to said height, and a ground clearance equal to said lower body ground clearance. Said transitioning body comprising a transitioning body length.

11 Claims, 8 Drawing Sheets

ANTI-ROLLOVER TRAILER

CROSS-REFERENCE TO RELATED APPLICATIONS

Not applicable.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

No prior art is known to the Applicant.

The present invention relates to trailers and more particularly to trailers having a low center of gravity.

For large tractor-trailers, the trailer may have a tendency to tip, lean or overturn due to the high trailer height and the weight especially the portion of the weight in the upper sections of the trailer. The height of the trailer may be due to the necessity of the trailer having a hitch which may be substantially raised from the ground in order to connect with the hitch mounted on the tractor. The hitch on the tractor must be lower than the hitch on the trailer so that the tractor can maneuver under the trailer for connection. This dictates that the space between the ground and the trailer is substantially wasted for carrying cargo.

The present invention provides a new type of transport vessel construction with the primary focus of the new construction type is to create transport vessels with a reduced tendency for tipping, leaning and/or overturning as compared to industry standard transport vessels used for the same purpose.

The transport vessel of the present invention is formed with a lower center of gravity than the prior art transport vessels by forming a portion of the transport vessel which may be a tank vessel to a point lower to the ground than the remaining portion of the transport vessel. This means that there is a significant difference in vertical height as measured from the ground between the lower portion of the transport vessel and the remaining portion of the transport vessel being designed to fit over the tractor/truck to pull the transport vessel.

The aforementioned difference in vertical height between centerlines of the transport vessel is achieved through use of a transitional vessel section of constant cross section. This transitional vessel section is formed in such a way that when the periphery of each end of the transitional section are vertically oriented, the centerline of the transitional section is at an angle. The effect of this transitional section is such that the centroid of the outside face of one end is offset vertically from the centroid of the outside face of the opposite end.

No prior art is known to the Applicant.

None of the known inventions and patents, taken either singularly or in combination, is seen to describe the instant disclosure as claimed.

BRIEF SUMMARY OF THE INVENTION

A trailer configured to lower an overall center of gravity. Said trailer comprises a tank, a wheel assembly, a kingpin assembly, a height, a length. Said tank comprising a cavity contained within a lower body, an upper body, a transitioning body, a front end, and a rear end. Said tank comprising a lower center of gravity, an upper center of gravity and said overall center of gravity. Said lower body comprising said lower center of gravity, a lower body ground clearance, a lower body length and a lower body height. Said upper body comprising said upper center of gravity, an upper body ground clearance, said height, and an upper body length. Said tank comprising said length, a height equal to said height, and a ground clearance equal to said lower body ground clearance. Said transitioning body comprising a transitioning body length. Said cavity configured to contain a one or more fluids. Said lower body height of said lower body is lower than said height of said upper body. Said transitioning body connects said upper body and said lower body. Said kingpin assembly of said trailer is mounted below said upper body. Said upper body ground clearance is a minimum height to selectively mate with a vehicle. Said lower body is configured minimize said lower body ground clearance to the fullest extent possible while ensuring said tank passes all safety codes and government requirements for said lower body ground clearance.

A trailer configured to lower an overall center of gravity. a one or more fluids comprising a gas fluid and a liquid fluid. A cavity comprising a lower cavity in a lower body, an upper cavity in an upper body, and a transitioning cavity in a transitioning body. Said liquid fluid fill portions of said lower cavity before filing portions of said transitioning cavity. A tank holds said liquid fluid lower and further back from said upper cavity by holding a greater percentage of said liquid fluid, having a higher density than said gas fluid, within said lower cavity than a lesser percentage of said liquid fluid within said upper cavity. Said one or more fluids comprising said gas fluid and said liquid fluid. Said cavity comprising said lower cavity in said lower body, said upper cavity in said upper body, and said transitioning cavity in said transitioning body. Said liquid fluid fill portions of said lower cavity before filing portions of said transitioning cavity. Said tank holds said liquid fluid lower and further back from said upper cavity by holding a greater percentage of said liquid fluid, having a higher density than said gas fluid, within said lower cavity than a lesser percentage of said liquid fluid within said upper cavity. Said lower cavity comprising a larger volume than said upper cavity. A lower body length of said lower body is larger than an upper body length of said upper body. Said lower cavity comprises a lower cavity volume. Said upper cavity comprises an upper cavity volume. Said transitioning cavity comprises a transitioning cavity volume. Said lower cavity volume is larger than said upper cavity volume.

A trailer configured to lower an overall center of gravity. Said trailer comprises a tank, a wheel assembly, a kingpin assembly, a height, a length. Said tank comprising a cavity contained within a lower body, an upper body, a transitioning body, a front end, and a rear end. Said tank comprising a lower center of gravity, an upper center of gravity and said overall center of gravity. Said lower body comprising said lower center of gravity, a lower body ground clearance, a lower body length and a lower body height. Said upper body comprising said upper center of gravity, an upper body ground clearance, said height, and an upper body length. Said tank comprising said length, a height equal to said height, and a ground clearance equal to said lower body ground clearance. Said transitioning body comprising a transitioning body length. Said cavity configured to contain a one or more fluids. Said lower body height of said lower body is lower than said height of said upper body. Said transitioning body connects said upper body and said lower body. Said kingpin assembly of said trailer is mounted below said upper body. Said upper body ground clearance is a minimum height to selectively mate with a vehicle. Said lower body is configured minimize said lower body ground clearance to the fullest extent possible while ensuring said tank passes all safety codes and government requirements for said lower body ground clearance. Said upper body is inclined so as to connect said transitioning body and said lower body. Said lower body and said transitioning body are substantially horizontal. Said transitioning body comprises an incline angle relative to horizontal. Said incline angle comprises approximately 15 degrees. Said lower body and said upper body are substantially horizontal.

BRIEF DESCRIPTION OF THE SEVERAL
VIEWS OF THE DRAWING

FIG. 1A illustrates an elevated first side view of a trailer 100.
FIG. 1B illustrates an elevated first side view of a trailer 100 with dimension labels.
FIG. 2A illustrates an elevated first side view of a trailer 100.
FIG. 2B illustrates an elevated first side view of a trailer 100.
FIG. 3 illustrates an elevated first side view of a trailer 100.
FIG. 4A illustrates an elevated first side view of a trailer 100.
FIG. 4B illustrates an elevated first side view of a one or more fluids 408.
FIG. 5 illustrates an elevated top side view of a trailer 100.
FIG. 6 illustrates an elevated back side view of a trailer 100.
FIG. 7 illustrates an elevated front side view of a trailer 100.
FIG. 8 illustrates an elevated first side view of a vehicle 800.

DETAILED DESCRIPTION OF THE
INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

These parts are illustrated in the figures and discussed below:
  a trailer 100
  a tank 102
  a lower body 104
  an upper body 106
  a transitioning body 108
  a front end 110
  a rear end 112
  a wheel assembly 114
  a portal 116
  a one or more legs 118
  a first leg 118a
  a second leg 118b
  a plurality of wheels 120
  a first wheel 120a
  a second wheel 120b
  a rear wheel fender 122
  a rear bumper 124
  a drain portal 126
  a kingpin assembly 128
  a height 130
  a length 132
  an upper body ground clearance 134
  a lower body height 136
  a lower body length 138
  a transitioning body length 140
  an upper body length 142
  a lower body ground clearance 144
  an incline angle 146
  a plurality of bands 202
  a first support band 202a
  a second support band 202b
  a third support band 202c
  a fourth support band 202d
  a fifth support band 202e
  a sixth support band 202f
  a seventh support band 202g
  a plurality of sections 206
  a first section 206a
  a second section 206b
  a third section 206c
  a fourth section 206d
  a fifth section 206e
  a sixth section 206f
  a seventh section 206g
  an eight section 206h
  a ninth section 206k
  a lower center of gravity 302
  an upper center of gravity 304
  an overall center of gravity 306
  a cavity 400
  a lower cavity 402
  an upper cavity 404
  a transitioning cavity 406
  a one or more fluids 408
  a gas fluid 408a
  a liquid fluid 408b
  a lower fluid 410
  an upper fluid 412
  a transitioning fluid 414
  a lower cavity volume 416
  an upper cavity volume 418
  a transitioning cavity volume 420
  a width 600
  a height 602
  a height 604
  a lateral center of gravity 606
  a vehicle 800

Figure 1A:
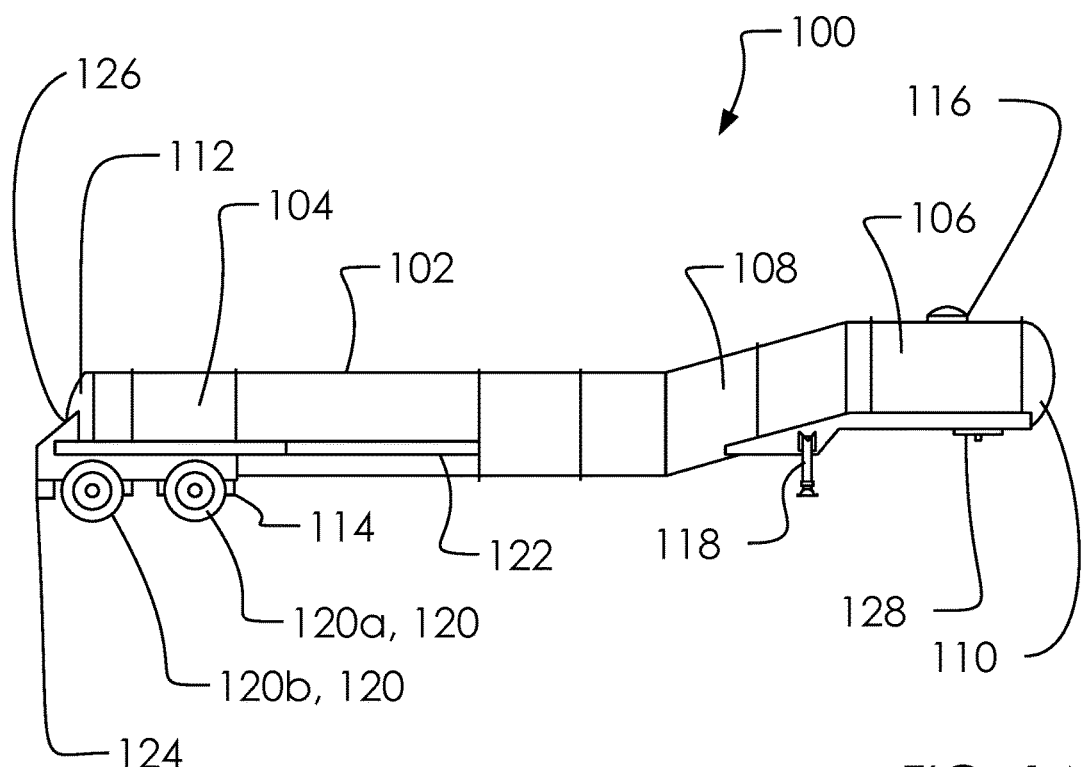
FIG. 1A illustrates an elevated first side view of a trailer 100.
Figure 1B:
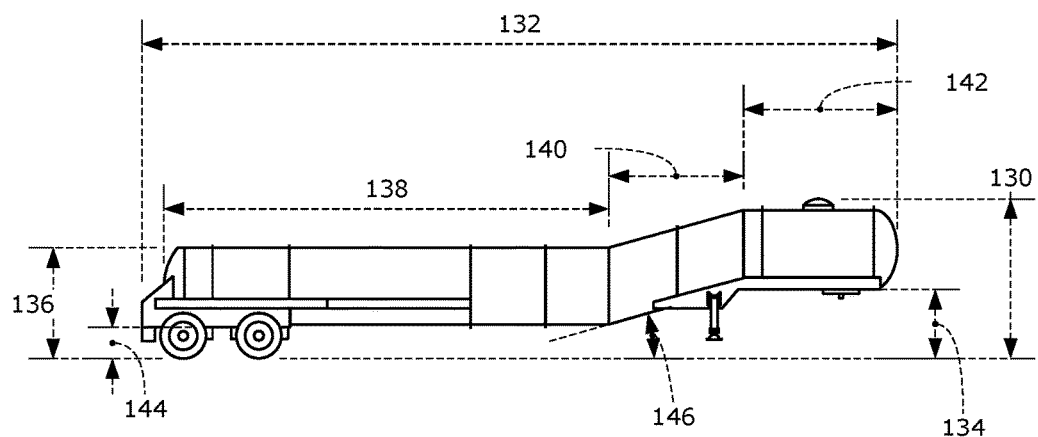
FIG. 1B illustrates an elevated first side view of a trailer 100 with dimension labels.

In one embodiment, said trailer 100 can comprise said tank 102, said wheel assembly 114, said portal 116, said portal 116, said one or more legs 118, said second leg 118b, said plurality of wheels 120, said rear bumper 124, said drain portal 126, said kingpin assembly 128, said height 130 and said length 132.

In one embodiment, said tank 102 can comprise said lower body 104, said upper body 106, said transitioning body 108, said front end 110 and said rear end 112.

In one embodiment, said lower body 104 can comprise said lower body height 136, said lower body length 138 and said lower body ground clearance 144.

In one embodiment, said upper body 106 can comprise said upper body length 142.

In one embodiment, said transitioning body 108 can comprise said upper body ground clearance 134, said transitioning body length 140 and said incline angle 146.

In one embodiment, said wheel assembly 114 can comprise said plurality of wheels 120.

In one embodiment, said one or more legs 118 can comprise said first leg 118a and said second leg 118b.

In one embodiment, said plurality of wheels 120 can comprise said first wheel 120a and said second wheel 120b.

In one embodiment, said transitioning body 108 (having a higher center of gravity) which can be connected to said front end 110 can be positioned at the forward end of trailer 100 to close off said cavity 400. Said transitioning body 108 can be a substantial cylinder shaped and can be hollow to form a portion of said cavity 400 and can include a fill portal 116 to allow fluid to be input into said cavity 400. Said cavity 400 can extend for the entire length of trailer 100 or have separate partitions.

Said lower body 104 (having a lower center of gravity) can be a cylinder or other shape as known in the art; wherein, lower body 104 can include a portion of said cavity 400 and can be substantially horizontal and positioned at the same angle as said transitioning body 108.

The rear end 112 can include said drain portal 126 to drain said cavity 400 and the rear end 112 can be connected to said rear bumper 124.

In one embodiment, lower body length 138 is greater than upper body length 142, as illustrated. Accordingly, the volume within of tank 102 is substantially contained within lower body 104.

In one embodiment, upper body ground clearance 134 is a minimum height to accommodate standard vehicles and to mate with a trailer hitch system of such vehicles, as is known in the art.

In one embodiment, lower body 104 can be configured minimize lower body ground clearance 144 to the fullest extent possible while ensuring tank 102 passes all safety codes and government requirements for lower body ground clearance 144. Accordingly, trailer 100 is configured to attach to standard vehicles and pass safety standards while lowering its overall mass, as discussed herein.

Figure 2A:
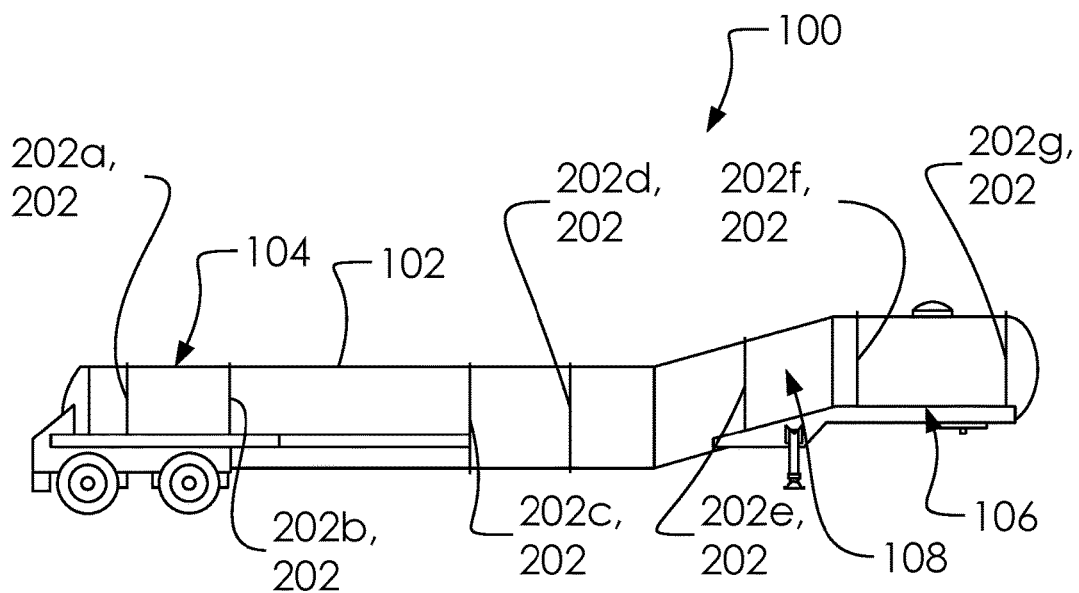

FIG. 2A illustrates an elevated first side view of a trailer 100.

Figure 2B:
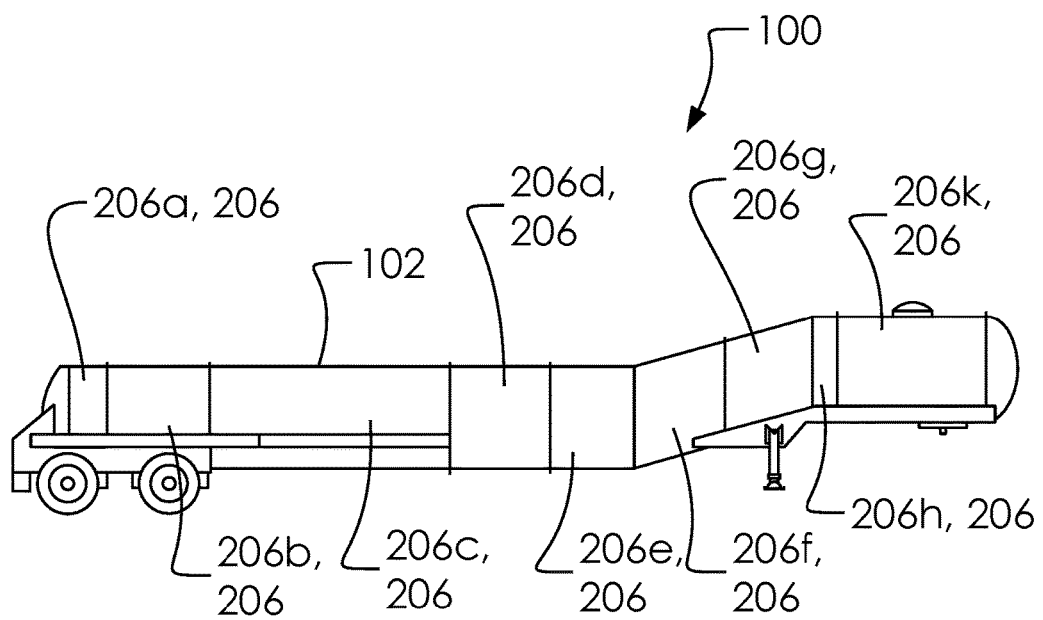

FIG. 2B illustrates an elevated first side view of a trailer 100.

In one embodiment, said plurality of bands 202 can comprise said first support band 202a, said second support band 202b, said third support band 202c, said fourth support band 202d, said fifth support band 202e, said sixth support band 202f and said seventh support band 202g.

In one embodiment, said plurality of sections 206 can comprise said first section 206a, said second section 206b, said third section 206c, said fourth section 206d, said fifth section 206e, said sixth section 206f, said seventh section 206g, said eight section 206h and said ninth section 206k.

In one embodiment, said lower body 104 can comprise said first support band 202a, said second support band 202b, said third support band 202c, said fourth support band 202d, said first section 206a, said second section 206b, said third section 206c, said fourth section 206d and said fifth section 206e.

In one embodiment, said upper body 106 can comprise said sixth support band 202f, said seventh support band 202g, said eight section 206h and said ninth section 206k.

In one embodiment, said transitioning body 108 can comprise said fifth support band 202e, said sixth section 206f and said seventh section 206g.

Said trailer 100 may include a plurality of sections 206 which may be integrally formed or which may be individually formed and connected together. The plurality of sections 206 may contain said plurality of bands 202 which may extend around the periphery of the plurality of sections 206. Each of the plurality of sections 206 may be formed from metal, plastic, wood, FRP (or a combination) or other appropriate material.

Each of the above-mentioned plurality of sections 206 can contain said plurality of bands 202 which can support said trailer 100.

Figure 3:
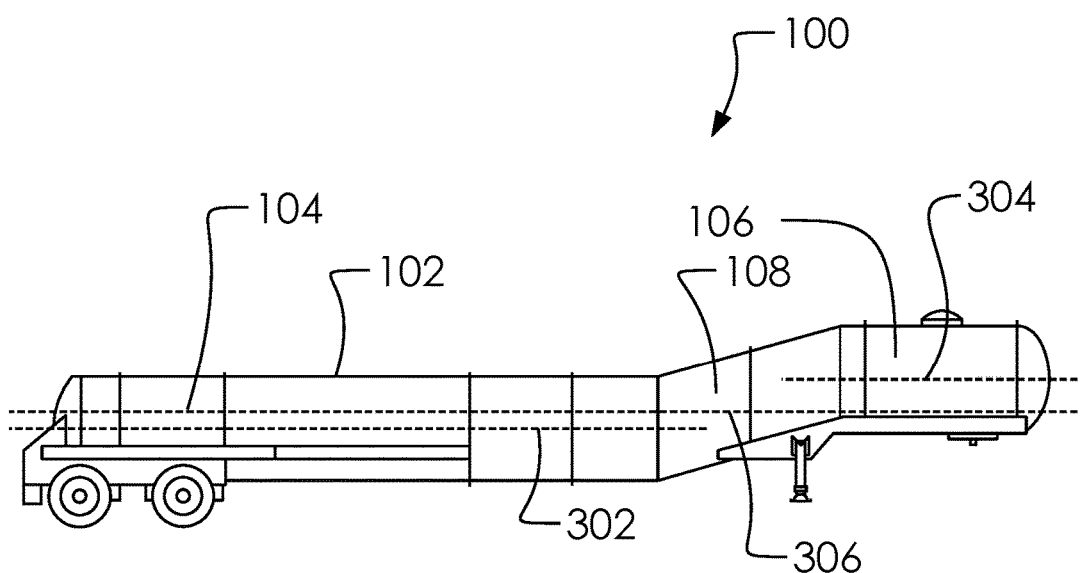

FIG. 3 illustrates an elevated first side view of a trailer 100.

In one embodiment, said trailer 100 can comprise said overall center of gravity 306.

In one embodiment, said lower body 104 can comprise said lower center of gravity 302.

In one embodiment, said upper body 106 can comprise said upper center of gravity 304.

Figure 4A:
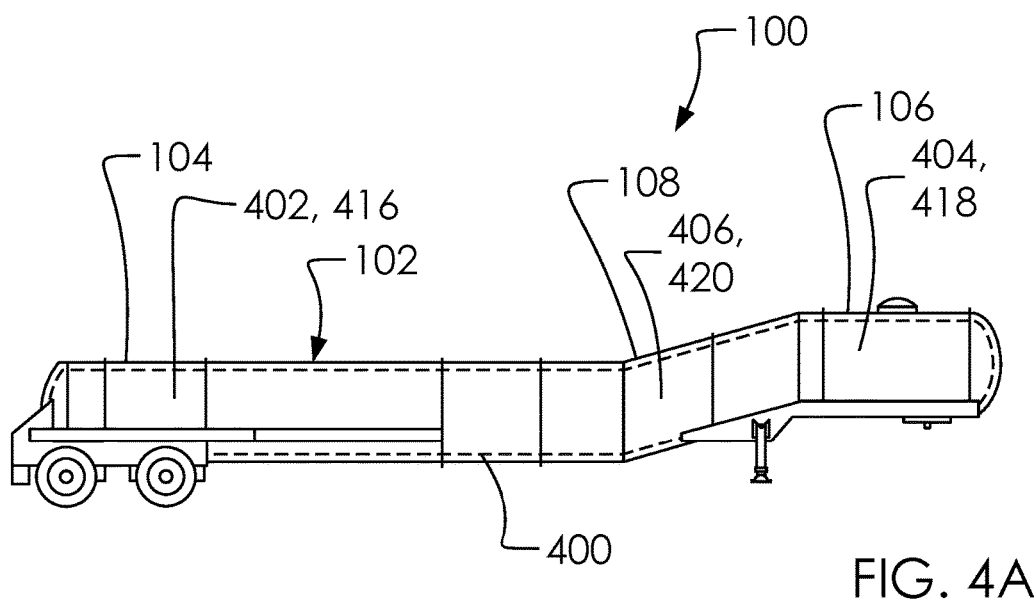

FIG. 4A illustrates an elevated first side view of a trailer 100.

Figure 4B:
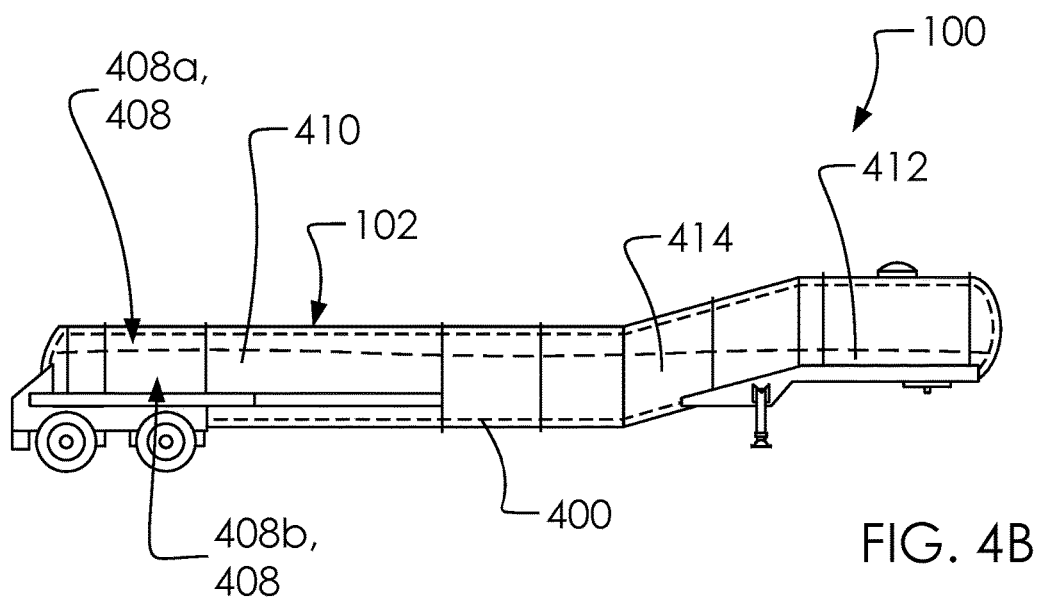

FIG. 4B illustrates an elevated first side view of a one or more fluids 408.

In one embodiment, said cavity 400 can comprise said lower cavity 402, said upper cavity 404 and said transitioning cavity 406.

In one embodiment, said lower cavity 402 can comprise said lower cavity volume 416.

In one embodiment, said upper cavity 404 can comprise said upper cavity volume 418.

In one embodiment, said transitioning cavity 406 can comprise said transitioning cavity volume 420.

In one embodiment, said one or more fluids 408 can comprise said gas fluid 408a and said liquid fluid 408b.

In one embodiment, said liquid fluid 408b can comprise said lower fluid 410, said upper fluid 412 and said transitioning fluid 414.

In one embodiment, said tank 102 can comprise said cavity 400.

In one embodiment, said cavity 400 can contain one or more fluids 408, as is known in the art.

One advantage of trailer 100 over conventional tanks is the distribution of mass within cavity 400. For example, in one embodiment, transitioning body 108 can comprise 108a/ and 108b/; wherein, gas fluid 408a fills an upper portion of cavity 400 and liquid fluid 408b fills a lower portion of cavity 400 (as is to be expected due to the make up of liquids and gasses). Said liquid fluid 408b can settle within cavity 400 so as to fill lower cavity 402 before filling upper cavity 404. Accordingly, said overall center of gravity 306 can be even lower and further back in trailer 100 when cavity 400 is partially filled with gas fluid 408a and liquid fluid 408b.

In another embodiment, cavity 400 can be substantially filled with liquid fluid 408b such that proportionately by volume said gas fluid 408a is substantially small. Wherein, said overall center of gravity 306 can be relatively low because lower cavity 402 comprises a much larger volume than upper cavity 404.

Figure 5:
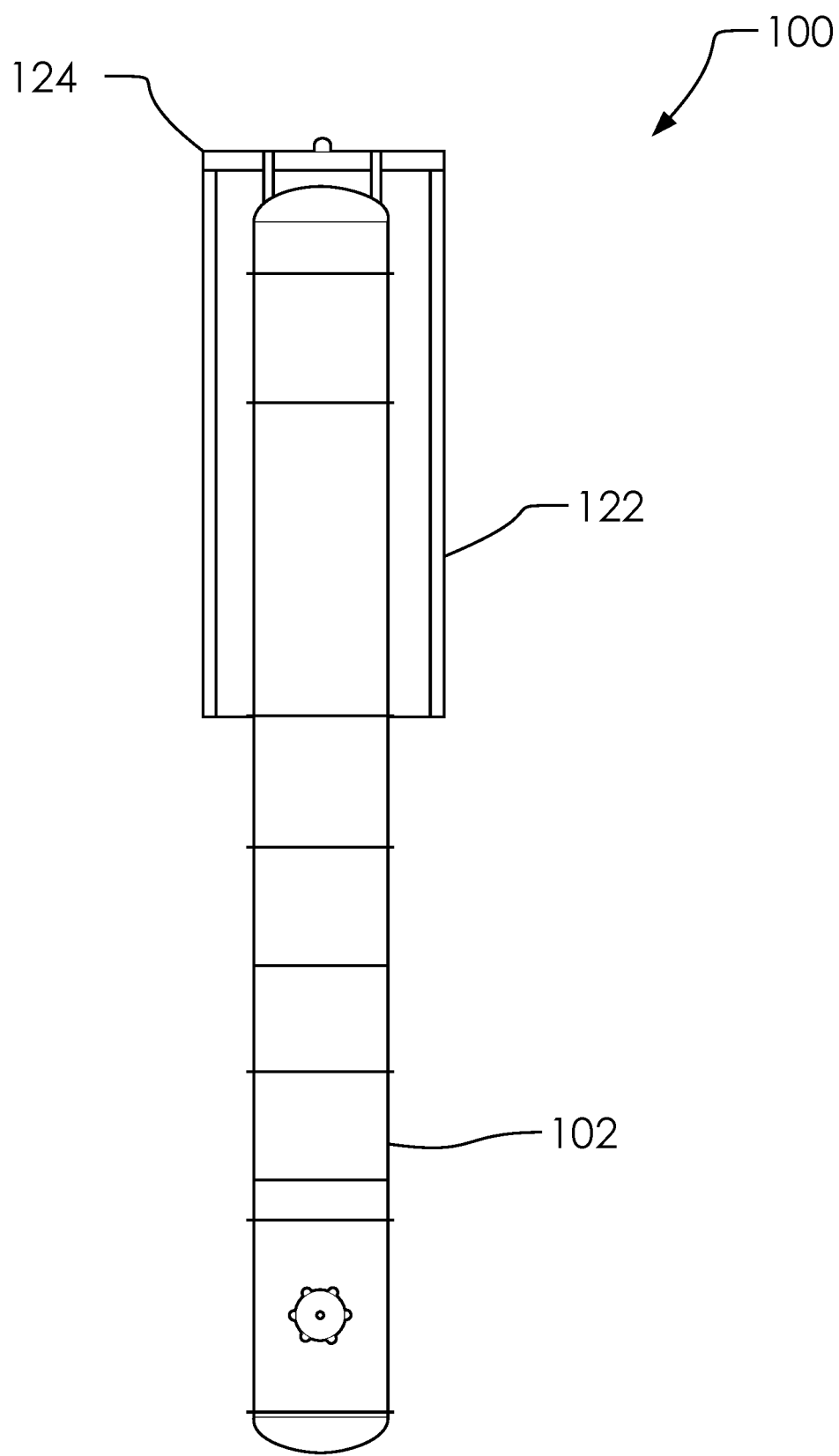

FIG. 5 illustrates an elevated top side view of a trailer 100.

Said rear wheel fender 122 can extend on opposing sides of trailer 100 and can extend along said 102 and the rear end 112.

Figure 6:
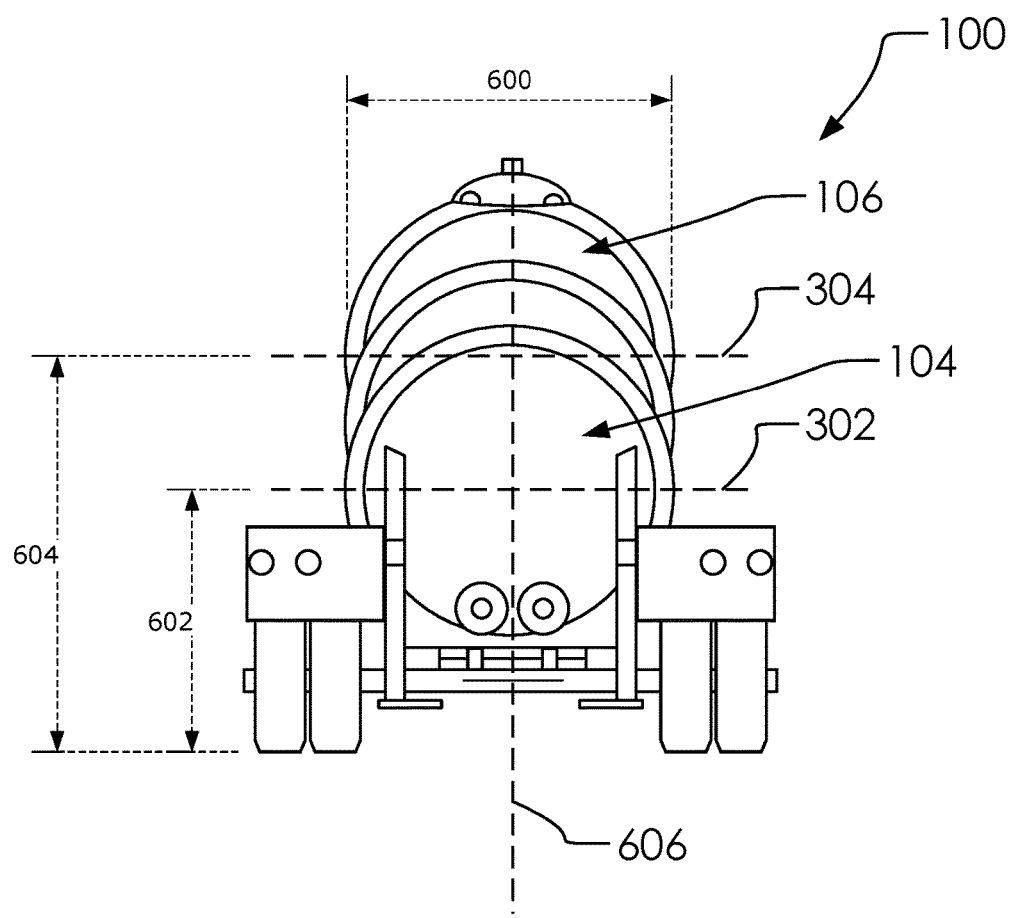

FIG. 6 illustrates an elevated back side view of a trailer 100.

In one embodiment, said tank 102 can comprise said width 600 and said lateral center of gravity 606.

In one embodiment, said lower body 104 can comprise said width 600.

In one embodiment, said upper body 106 can comprise said width 600.

In one embodiment, said transitioning body 108 can comprise said width 600.

In one embodiment, said lower center of gravity 302 can comprise said height 602.

In one embodiment, said upper center of gravity 304 can comprise said height 604.

The plurality of sections 206 may have a circular cross-section, oval cross-section, rectangular cross-section or a combination or other appropriate cross-section shapes.

Figure 7:
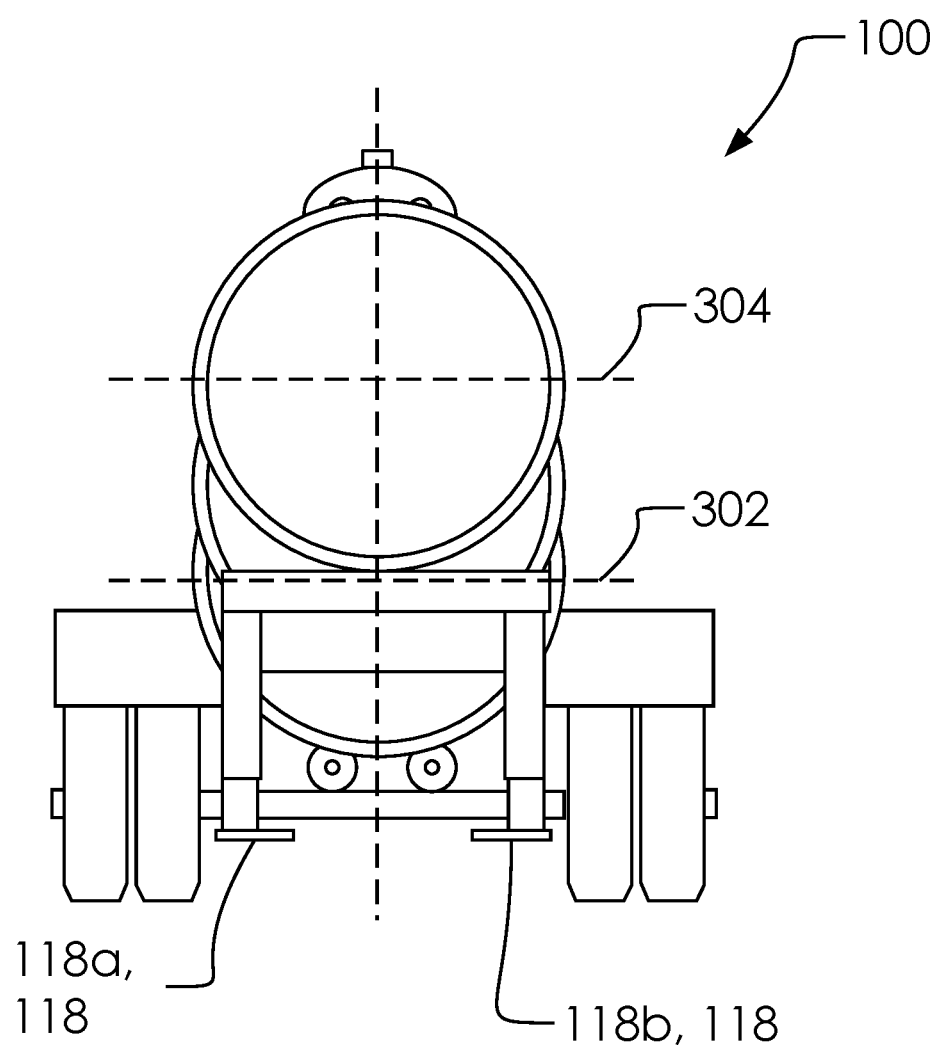

FIG. 7 illustrates an elevated front side view of a trailer 100.

Figure 8:
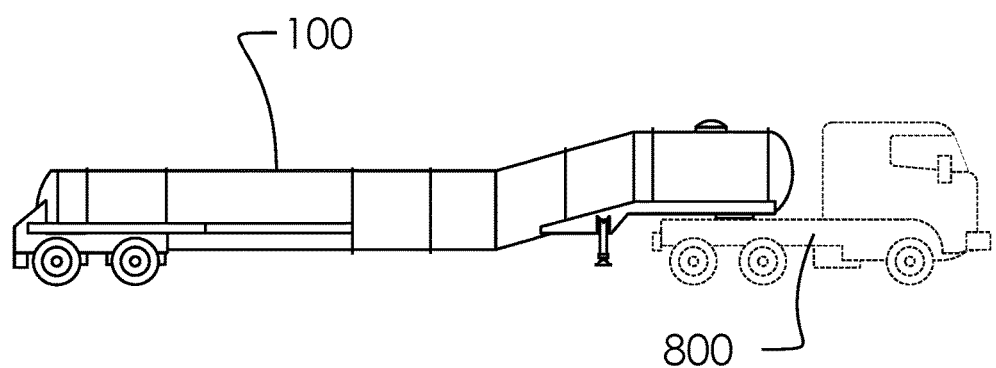

FIG. 8 illustrates an elevated first side view of a vehicle 800.

Said vehicle 800 is provided for illustrative purposes

The following sentences are included for completeness of this disclosure with reference to the claims.

A trailer 100 configured to lower an overall center of gravity 306. Said trailer 100 comprises a tank 102, a wheel assembly 114, a kingpin assembly 128, a height 130, a length 132. Said tank 102 comprising a cavity 400 contained within a lower body 104, an upper body 106, a transitioning body 108, a front end 110, and a rear end 112. Said tank 102 comprising a lower center of gravity 302, an upper center of gravity 304 and said overall center of gravity 306. Said lower body 104 comprising said lower center of gravity 302, a lower body ground clearance 144, a lower body length 138 and a lower body height 136. Said upper body 106 comprising said upper center of gravity 304, an upper body ground clearance 134, said height 130, and an upper body length 142. Said tank 102 comprising said length 132, a height equal to said height 130, and a ground clearance equal to said lower body ground clearance 144. Said transitioning body 108 comprising a transitioning body length 140. Said cavity 400 configured to contain a one or more fluids 408. Said lower body height 136 of said lower body 104 is lower than said height 130 of said upper body 106. Said transitioning body 108 connects said upper body 106 and said lower body 104. Said kingpin assembly 128 of said trailer 100 is mounted below said upper body 106. Said upper body ground clearance 134 is a minimum height to selectively mate with a vehicle 800. Said lower body 104 is configured minimize said lower body ground clearance 144 to the fullest extent possible while ensuring said tank 102 passes all safety codes and government requirements for said lower body ground clearance 144.

Said one or more fluids 408 comprising a gas fluid 408a and a liquid fluid 408b. Said cavity 400 comprising a lower cavity 402 in said lower body 104, an upper cavity 404 in said upper body 106, and a transitioning cavity 406 in said transitioning body 108. Said liquid fluid 408b fill portions of said lower cavity 402 before filing portions of said transitioning cavity 406. Said tank 102 holds said liquid fluid 408b lower and further back from said upper cavity 404 by holding a greater percentage of said liquid fluid 408b, having a higher density than said gas fluid 408a, within said lower cavity 402 than a lesser percentage of said liquid fluid 408b within said upper cavity 404.

Said lower cavity 402 comprising a larger volume than said upper cavity 404. Said lower body length 138 of said lower body 104 is larger than said upper body length 142 of said upper body 106. Said lower cavity 402 comprises a lower cavity volume 416. Said upper cavity 404 comprises an upper cavity volume 418. Said transitioning cavity 406 comprises a transitioning cavity volume 420. Said lower cavity volume 416 is larger than said upper cavity volume 418.

A lower body 104, an upper body 106 and a transitioning body 108 comprise a width 600.

Said upper body 106 is inclined so as to connect said transitioning body 108 and said lower body 104. Said lower body 104 and said transitioning body 108 are substantially horizontal.

A transitioning body 108 comprises an incline angle 146 relative to horizontal. Said incline angle 146 comprises approximately 15 degrees. A lower body 104 and an upper body 106 are substantially horizontal.

Each of said lower body 104, said upper body 106 and said transitioning body 108 are substantially cylindrical.

Said lower body 104 is at a rear portion of said tank 102. Said transitioning body 108 is at a forward portion of said tank 102.

Said lower body 104 is supported by said wheel assembly 114.

Said wheel assembly 114 comprising a plurality of wheels 120. Said trailer 100 comprising a one or more legs 118. Said one or more legs 118 configured to selectively extend and contract for support of said trailer 100.

Said tank 102 comprising a plurality of bands 202 and a plurality of sections 206.

Said cavity 400 being sealed for selectively holding said one or more fluids 408. A trailer 100 configured to lower an overall center of gravity 306.

A one or more fluids 408 comprising a gas fluid 408a and a liquid fluid 408b. A cavity 400 comprising a lower cavity 402 in a lower body 104, an upper cavity 404 in an upper body 106, and a transitioning cavity 406 in a transitioning body 108. Said liquid fluid 408b fill portions of said lower cavity 402 before filing portions of said transitioning cavity 406. A tank 102 holds said liquid fluid 408b lower and further back from said upper cavity 404 by holding a greater percentage of said liquid fluid 408b, having a higher density than said gas fluid 408a, within said lower cavity 402 than a lesser percentage of said liquid fluid 408b within said upper cavity 404. Said one or more fluids 408 comprising said gas fluid 408a and said liquid fluid 408b. Said cavity 400 comprising said lower cavity 402 in said lower body 104, said upper cavity 404 in said upper body 106, and said transitioning cavity 406 in said transitioning body 108. Said liquid fluid 408b fill portions of said lower cavity 402 before filing portions of said transitioning cavity 406. Said tank 102 holds said liquid fluid 408b lower and further back from said upper cavity 404 by holding a greater percentage of said liquid fluid 408b, having a higher density than said gas fluid 408a, within said lower cavity 402 than a lesser percentage of said liquid fluid 408b within said upper cavity 404. Said lower cavity 402 comprising a larger volume than said upper cavity 404. A lower body length 138 of said lower body 104 is larger than an upper body length 142 of said upper body 106. Said lower cavity 402 comprises a lower cavity volume 416. Said upper cavity 404 comprises an upper cavity volume 418. Said transitioning cavity 406 comprises a transitioning cavity volume 420. Said lower cavity volume 416 is larger than said upper cavity volume 418.

Said upper body 106 is inclined so as to connect said transitioning body 108 and said lower body 104. Said lower body 104 and said transitioning body 108 are substantially horizontal.

A transitioning body 108 comprises an incline angle 146 relative to horizontal. Said incline angle 146 comprises approximately 15 degrees. A lower body 104 and an upper body 106 are substantially horizontal.

Said lower body 104, said upper body 106 and said transitioning body 108 comprise a width 600. A trailer 100 configured to lower an overall center of gravity 306.

Said trailer 100 comprises a tank 102, a wheel assembly 114, a kingpin assembly 128, a height 130, a length 132. Said tank 102 comprising a cavity 400 contained within a lower body 104, an upper body 106, a transitioning body 108, a front end 110, and a rear end 112. Said tank 102 comprising a lower center of gravity 302, an upper center of gravity 304 and said overall center of gravity 306. Said lower body 104 comprising said lower center of gravity 302, a lower body ground clearance 144, a lower body length 138 and a lower body height 136. Said upper body 106 comprising said upper center of gravity 304, an upper body ground clearance 134, said height 130, and an upper body length 142. Said tank 102 comprising said length 132, a height equal to said height 130, and a ground clearance equal to said lower body ground clearance 144. Said transitioning body 108 comprising a transitioning body length 140. Said cavity 400 configured to contain a one or more fluids 408. Said lower body height 136 of said lower body 104 is lower than said height 130 of said upper body 106. Said transitioning body 108 connects said upper body 106 and said lower body 104. Said kingpin assembly 128 of said trailer 100 is mounted below said upper body 106. Said upper body ground clearance 134 is a minimum height to selectively mate with a vehicle 800. Said lower body 104 is configured minimize said lower body ground clearance 144 to the fullest extent possible while ensuring said tank 102 passes all safety codes and government requirements for said lower body ground clearance 144. Said upper body 106 is inclined so as to connect said transitioning body 108 and said lower body 104. Said lower body 104 and said transitioning body 108 are substantially horizontal. Said transitioning body 108 comprises an incline angle 146 relative to horizontal. Said incline angle 146 comprises approximately 15 degrees. Said lower body 104 and said upper body 106 are substantially horizontal.

A cavity 400 being sealed for selectively holding a one or more fluids 408.

Each of said lower body 104, said upper body 106 and said transitioning body 108 are substantially cylindrical.

Said lower body 104 is at a rear portion of said tank 102. Said transitioning body 108 is at a forward portion of said tank 102.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A trailer configured to lower an overall center of gravity, wherein:
   said trailer comprises a tank, a wheel assembly, a height and a length;
   said tank comprises a cavity contained within a lower body, an upper body, a transitioning body, a front end, and a rear end;
   said tank comprises a lower center of gravity, an upper center of gravity and said overall center of gravity;
   said lower body comprises said lower center of gravity, a lower body ground clearance, a lower body length and a lower body height;
   said upper body comprises said upper center of gravity, an upper body ground clearance, said height, and an upper body length;
   said tank comprises said length, a height equal to said height of said upper body, and a ground clearance equal to said lower body ground clearance;
   said transitioning body comprises a transitioning body length;
   said cavity configured to contain a one or more fluids;
   said lower body height of said lower body is lower than said height of said upper body;
   said transitioning body connects said upper body and said lower body;
   said upper body ground clearance is a minimum height to selectively mate with a vehicle;
   said transitioning body is inclined to connect said upper body and said lower body;
   said lower body and said upper body are substantially horizontal;
   said lower body, said upper body and said transitioning body each comprise circular cross-section having a width;
   said width comprises a diameter of said circular cross-section;
   said diameter of said lower body, said upper body and said transitioning body are equal; and
   when said cavity within said trailer is filled with a liquid fluid, said liquid fluid is evenly distributed along said length of said trailer since said diameter of said lower body, said upper body and said transitioning body are equal.

2. The trailer from claim 1, wherein:
   said one or more fluids comprises a gas fluid and said liquid fluid;
   said cavity comprises a lower cavity in said lower body, an upper cavity in said upper body, and a transitioning cavity in said transitioning body;

said liquid fluid are configured to fill portions of said lower cavity before filing portions of said transitioning cavity; and said tank holds said liquid fluid lower and further back from said upper cavity by
holding a greater percentage of said liquid fluid, having a higher density than said gas fluid, within said lower cavity than a lesser percentage of said liquid fluid within said upper cavity.

3. The trailer from claim 2, wherein:
said lower cavity comprises a larger volume than said upper cavity;
said lower body length of said lower body is larger than said upper body length of said upper body;
said lower cavity comprises a lower cavity volume;
said upper cavity comprises an upper cavity volume;
said transitioning cavity comprises a transitioning cavity volume; and
said lower cavity volume is larger than said upper cavity volume.

4. The trailer from claim 1, wherein:
a transitioning body comprises an incline angle;
said incline angle comprises approximately 15 degrees; and
a lower body and an upper body are substantially horizontal.

5. The trailer from claim 1, wherein:
each of said lower body, said upper body and said transitioning body are substantially cylindrical.

6. The trailer from claim 1, wherein:
said lower body is at a rear portion of said tank; and
said transitioning body is at a forward portion of said tank.

7. The trailer from claim 6, wherein:
said lower body is supported by said wheel assembly.

8. The trailer from claim 1, wherein:
said wheel assembly comprises a plurality of wheels;
said trailer comprises a one or more legs; and
said one or more legs configured to selectively extend and contract for support of said trailer.

9. The trailer from claim 1, wherein:
said tank comprises a plurality of bands and a plurality of sections.

10. The trailer from claim 1, wherein:
said cavity being sealed for selectively holding said one or more fluids.

11. The trailer from claim 1, wherein:
said trailer further comprises a kingpin assembly; and
said kingpin assembly of said trailer is mounted below said upper body.

* * * * *

(12) SUPPLEMENTAL EXAMINATION CERTIFICATE

United States Patent　　　　　　　　　　(10) Number:* US 10,435,089 F1
Dill　　　　　　　　　　　　　　　　　(45) Certificate Issued: Jun. 1, 2020

Control No.: 96/000,325　　　　　　　Filing Date: May 13, 2020
Primary Examiner: Russell D. Stormer No substantial new question of patentability is raised in the request for supplemental examination. See the Reasons for Substantial New Question of Patentability Determination in the file of this proceeding.

(56) Items of Information

U.S. PATENT DOCUMENTS

| | | |
|---|---|---|
| 2339303 | 1/18/1944 | Tillery |
| 3880438 | 4/29/1975 | Klein |
| 3883148 | 5/13/1975 | Miller |
| 4331342 | 5/25/1982 | van der Lely |
| 5593070 | 1/14/1997 | Steadman |
| 5782493 | 7/21/1998 | Bolton et al |
| 8523232 | 9/3/2013 | DeLaRosa et al |
| 8801040 | 8/12/2014 | Thomas et al |
| 2016/0193950 | 7/7/2016 | Kibler |

FOREIGN PATENT DOCUMENTS

| | | |
|---|---|---|
| CN | 202806522U | 3/20/2015 |
| JP | 2013184725 A | 9/19/2013 |
| JP | 2007099192 A | 4/19/2007 |

* This Supplemental Certficiate has been reissued in order to correct a typographical error in the certificate number.